June 6, 1961  L. NIXON  2,987,009
AERIAL TRANSPORTER AND SYSTEM
Filed March 1, 1957   9 Sheets-Sheet 1

June 6, 1961 L. NIXON 2,987,009
AERIAL TRANSPORTER AND SYSTEM
Filed March 1, 1957 9 Sheets-Sheet 5

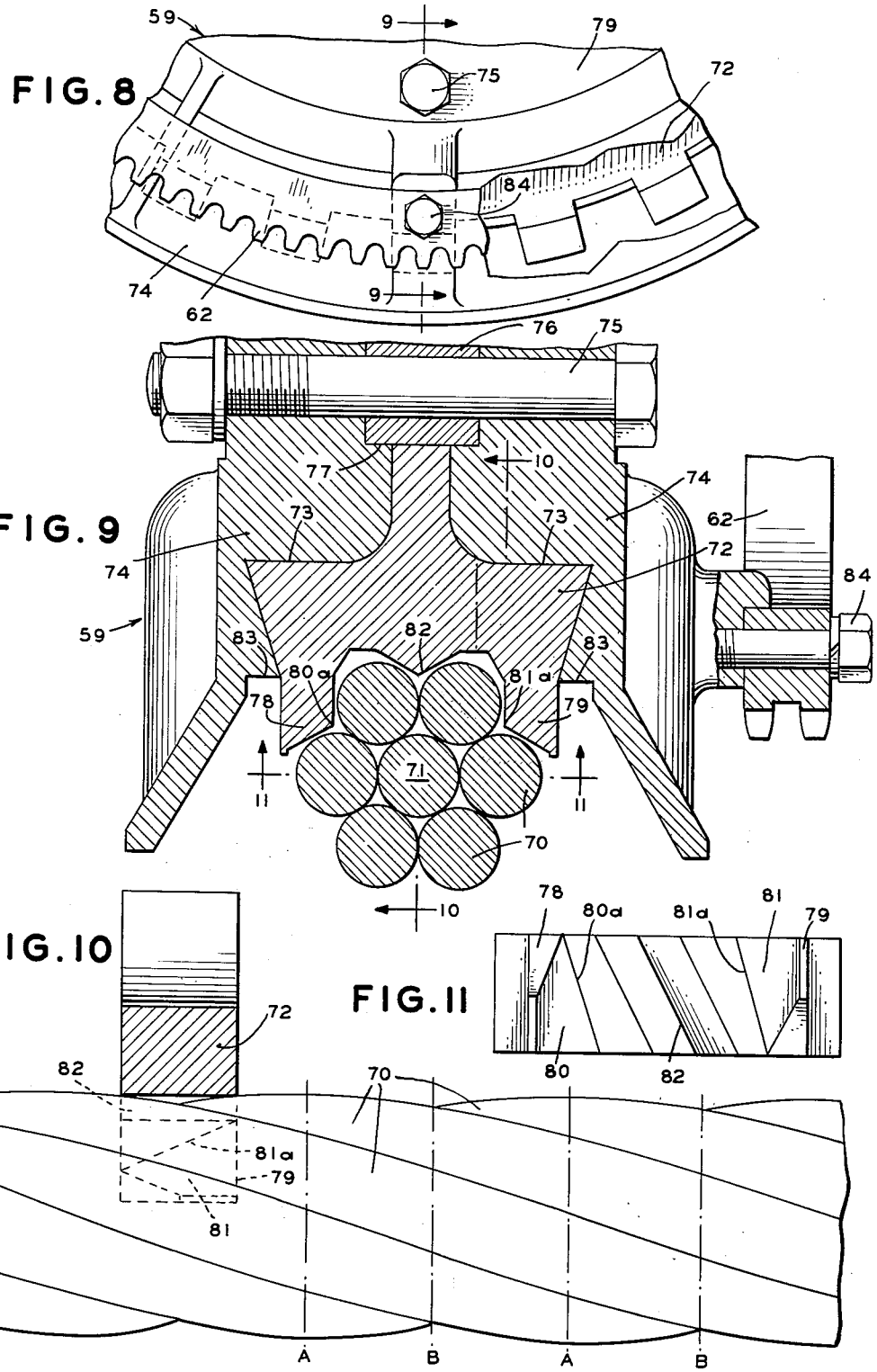

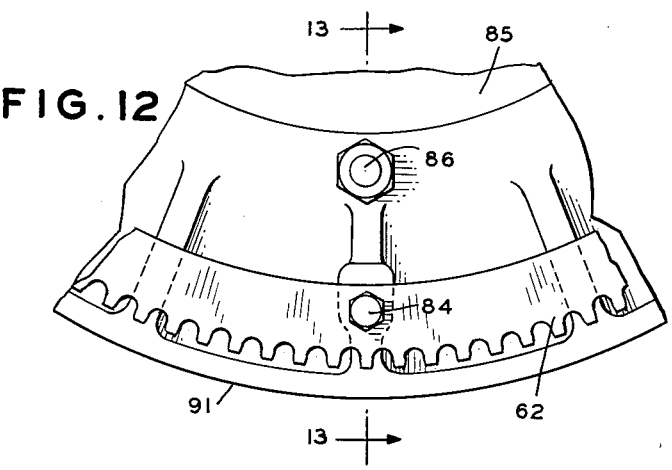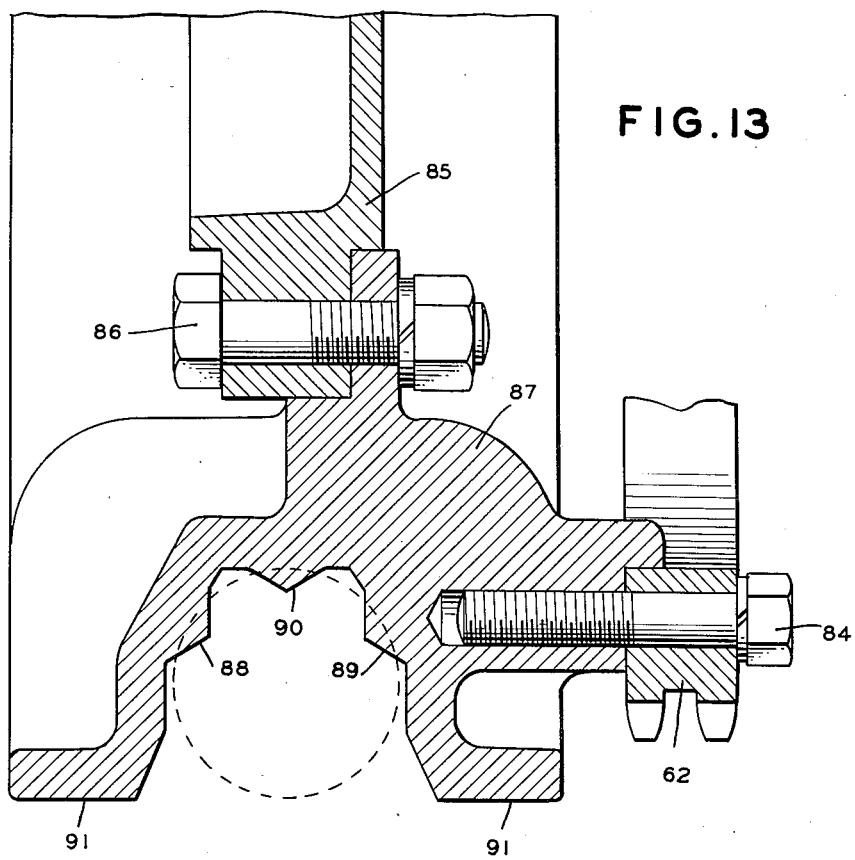

June 6, 1961 L. NIXON 2,987,009
AERIAL TRANSPORTER AND SYSTEM
Filed March 1, 1957 9 Sheets-Sheet 8

United States Patent Office 2,987,009
Patented June 6, 1961

2,987,009
AERIAL TRANSPORTER AND SYSTEM
Leroy Nixon, Newtown, Pa., assignor to The Colorado Fuel and Iron Corporation, a corporation of Colorado
Filed Mar. 1, 1957, Ser. No. 643,451
23 Claims. (Cl. 104—112)

This invention relates to an improved aerial transportation system in which a load is suspended from and propelled along an aerial way and more particularly to a self-propelled transporter especially well suited for use in such a system.

Various types of aerial transportation systems have long been known and used. However, while such systems have important advantages over ground level transportation systems, particularly where difficult terrain must be traversed, the usefulness thereof is seriously impaired by limitations inherent therein. One important limitation resulting from the construction of such systems resides in the fact that the catenary curvature of the ropes between the support towers introduces a substantial gradient, navigation of which usually requires a hauling rope or a traction rope. In one general class a hauling rope is utilized which is connected in one way or another to the individual transporters. One or more such transporters may be in motion at a given time but all those attached to hauling ropes driven by the same source of power must necessarily move and stop together and cannot move relative to one another.

In another arrangement a traction rope is utilized which may be in continuous motion. In this case, the transporters may be equipped with grippers to engage and disengage the traction rope, thereby attaining a limited degree of independence of movement relative to one another. A disadvantage common to both of the foregoing types of installations resides in the fact that the total load which may be transported at one time is limited to the capacity of the hauling or traction rope.

Yet another class of installation utilizes a traction rope which is stationary but is snubbed around driven members of a transporter having its own power plant. The transporter has wheels which run on the aerial ropeway and hauls itself by means of the frictional engagement between the driven members and the traction rope. A serious drawback of these various systems is that each is limited to operation along substantially straight-line aerial ways and may not readily be switched from one way to another extending at a substantial angle thereto.

It is, therefore, a principal object of this invention to provide a unique aerial transportation system derived from a novel arrangement and consolidation of the parts thereof, together with an improved self-propelled transporter.

Another object is to provide such system which permits a high degree of flexibility in the routing of the transporters from point to point.

A further object is to provide such a system in which a plurality of transporters may be utilized along an aerial way with each transporter being substantially independent of the others.

Another more specific object is to provide an aerial transporter which is self-propelled and capable of traversing an aerial way which includes both rope or cable ways and one or more rigid rail sections with the transporter deriving its traction power from frictional engagement of its running members with the aerial way which also affords the sole support for the transporter.

In accordance with the present invention there is provided an aerial transportation system utilizing dual ropes which are supported in space in parallel relation between what may be termed the main terminus of the system, one or more switching stations and a plurality of way stations. The switching stations may be linked by an aerial way to one or more of the other switching stations in addition to the common terminus. Switching stations are usually located intermediate the terminus and a group of way stations which are more or less closely spaced with the way stations in any one group linked to the switching station, either directly or through another station, dependent upon their relative angular disposition.

Switching means are provided at each of the switching stations so that a transporter travelling, say, from the terminus on arriving at the switching station may continue on through on a substantially straight-line path or may be switched to any one of several other directions determined by the location of the stations in the group serviced by that particular switching station. The switch means preferably includes relatively short, rigid rail sections, adapted to selectively link one of the aerial ways radiating out of the switching station with the aerial way linking the switch station with the terminus.

The aerial transporters are each self-propelled and include a power unit connected to running members driven thereby and which serve to support the transporter on and propel it along the aerial-way. The utilization of self-propelled transporters dependent solely upon the engagement of its driven running members with the suspended wire ropes for traction and unaided by hauling or traction ropes makes it possible for the transporter to pass from a section of the aerial-way formed by wire rope onto a rigid rail section and back to a wire rope section without stopping. The rigid rail sections, being relatively short, may be horizontally disposed thereby requiring a minimum of traction. However, relatively long lengths of the wire ropes are suspended between widely spaced supporting towers, and the normal curvature thereof, even over relatively level terrain, forms gradients which require a substantially greater coefficient of friction than provided by normal metal-to-metal contact.

In accordance with this invention the running members are constructed to take advantage of an cooperate with the construction of the wire ropes so as to provide traction equivalent to a coefficient of friction remarkably greater than heretofore attainable. The present invention is especially well suited for use with the type of wire rope constructed of a plurality of strands twisted about a common center. The strands themselves may each comprise a bundle of wires twisted about a center. The number of strands and the number of the wire bundles in each imparts a characteristic external configuration to the wire rope.

In one embodiment a plurality of shoes constructed of suitable material are mounted in spaced relation to form an endless array about each of the driven members. The shoes are themselves recessed to encompass a substantial portion of the wire rope and thereby in effect form a channel through which the rope passes. The spacing of the shoes about the driven members, other things being equal, depends upon the number of strands and the number of twists per inch or length of lay of the stranded wire rope. In a six strand twelve inch lay rope, the shoes are mounted so as to be spaced, center to center, a distance such that they engage the rope every two inches or integral multiple thereof. The reversely tapered inner walls of the arms of the shoes form constrictions which are consequently aligned to mesh with the periodically recurring indentations or valleys in the contour of the wire rope along the oppositely disposed lines of contact.

In a further embodiment the driven members of the self-propelled aerial transporters are provided with a rim or peripheral liner having a repetitive endless pattern of teeth which, as in the case of the aforementioned shoes, are located so as to engage the rope strands at successive spaced points. The teeth are provided in a plurality of spaced groups of three with one tooth in each group engaging approximately the middle and the other two the opposite sides of the rope. The center tooth extends at an angle to the longitudinal axis of the rope so as to seat in the helical groove formed by two adjacent strands along the upper surface of the rope.

Further objects and advantages of this invention will be apparent from the following detailed description thereof and the accompanying drawings in which FIGURE 1 is a diagrammatic view of an aerial system constructed in accordance with the present invention;

FIGURE 8 is a fragmentary side elevational view of one of the driven running members of the transporter, partially broken away for convenience;

FIGURE 9 is a sectional view through the line 9—9 of FIGURE 8;

Figure 14:
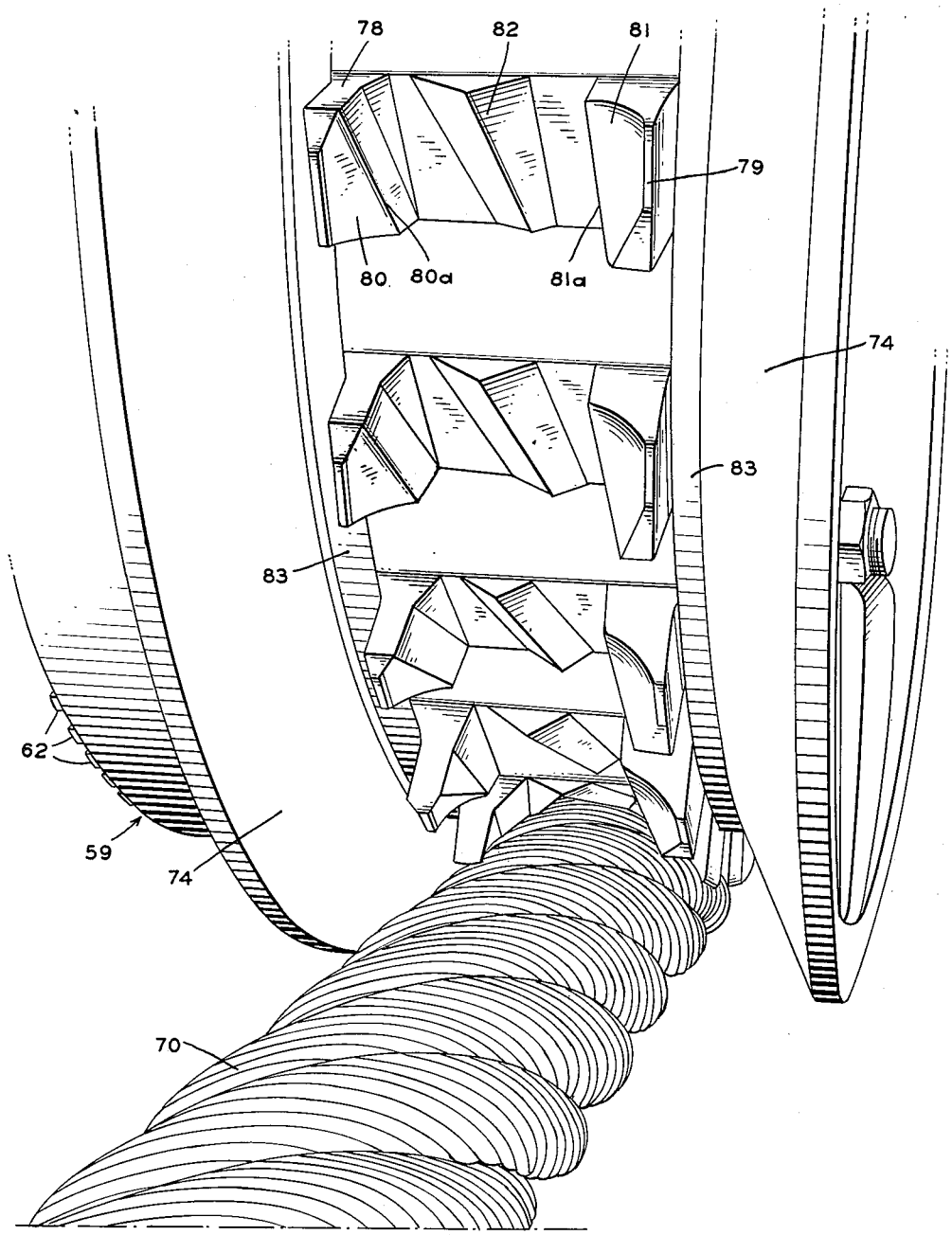
Figure 15:
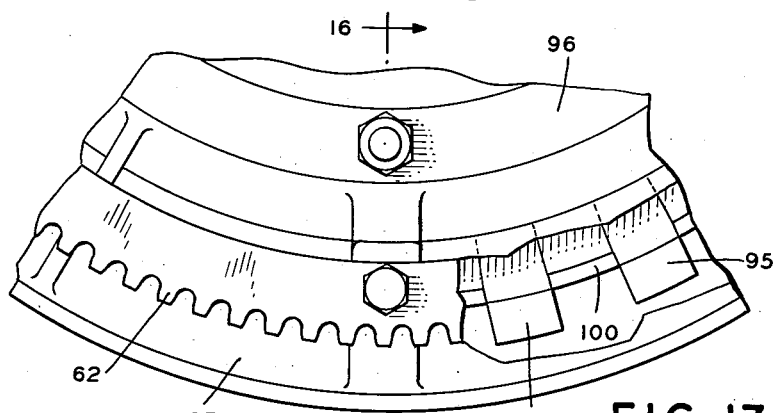
Figure 16:
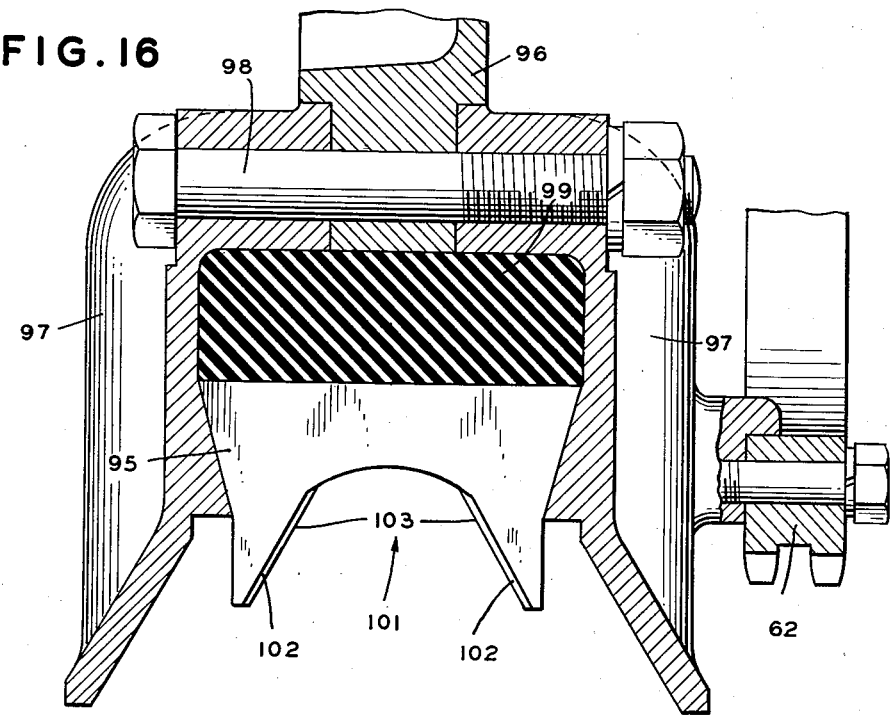

FIGURES 10 and 11 are sectional views through the lines 10—10 and 11—11 respectively of FIGURE 9;

FIGURE 12 is a fragmentary side elevational view of another form of driven running member;

FIGURE 13 is a sectional view through the line 13—13 of FIGURE 12 on an enlarged scale;

FIGURE 14 is a perspective view showing a driven running member with the preferred arrangement of shoes thereon in engagement with a wire rope forming part of the aerial way;

FIGURE 15 is a view similar to FIGURE 8 of another type of running member;

FIGURE 16 is a cross-sectional view through the line 16—16 of FIGURE 15; and

Figure 17:
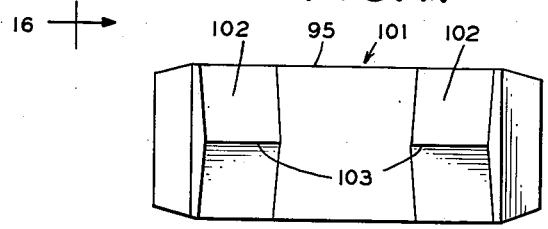

FIGURE 17 is a plan view of the traction lug shown in FIGURE 16.

Referring now to the drawings in detail and to FIGURES 1-5 in particular, the aerial transportation system includes an aerial rope way 20 which in the present instance is formed by two spaced wire ropes 21, suspended in side by side parallel relation from suspension towers 22 spaced apart depending upon the nature of the terrain being traversed and the loads to be carried. Customarily, towers 22 are spaced as far apart as practicable and even over level terrain the aerial way will include recurrent gradients due to the catenary curve described by the wire ropes between successive towers. A long expanse of the aerial way designated as "A" may be provided between two relatively remote areas such as supply point or terminus 23 and a plurality of working areas or substations 24. It will be appreciated that the distance between terminus 23 and the general area in which the substations are located may be much greater than the distance between the substations themselves. Conveniently, terminus 23 is joined directly to the substation which is most centrally located with respect to the other substations in its general area. Such a centrally located substation is indicated at 24a and it in turn is linked up with the remaining substations which in the present instance are shown radially located relative thereto.

Figure 2:
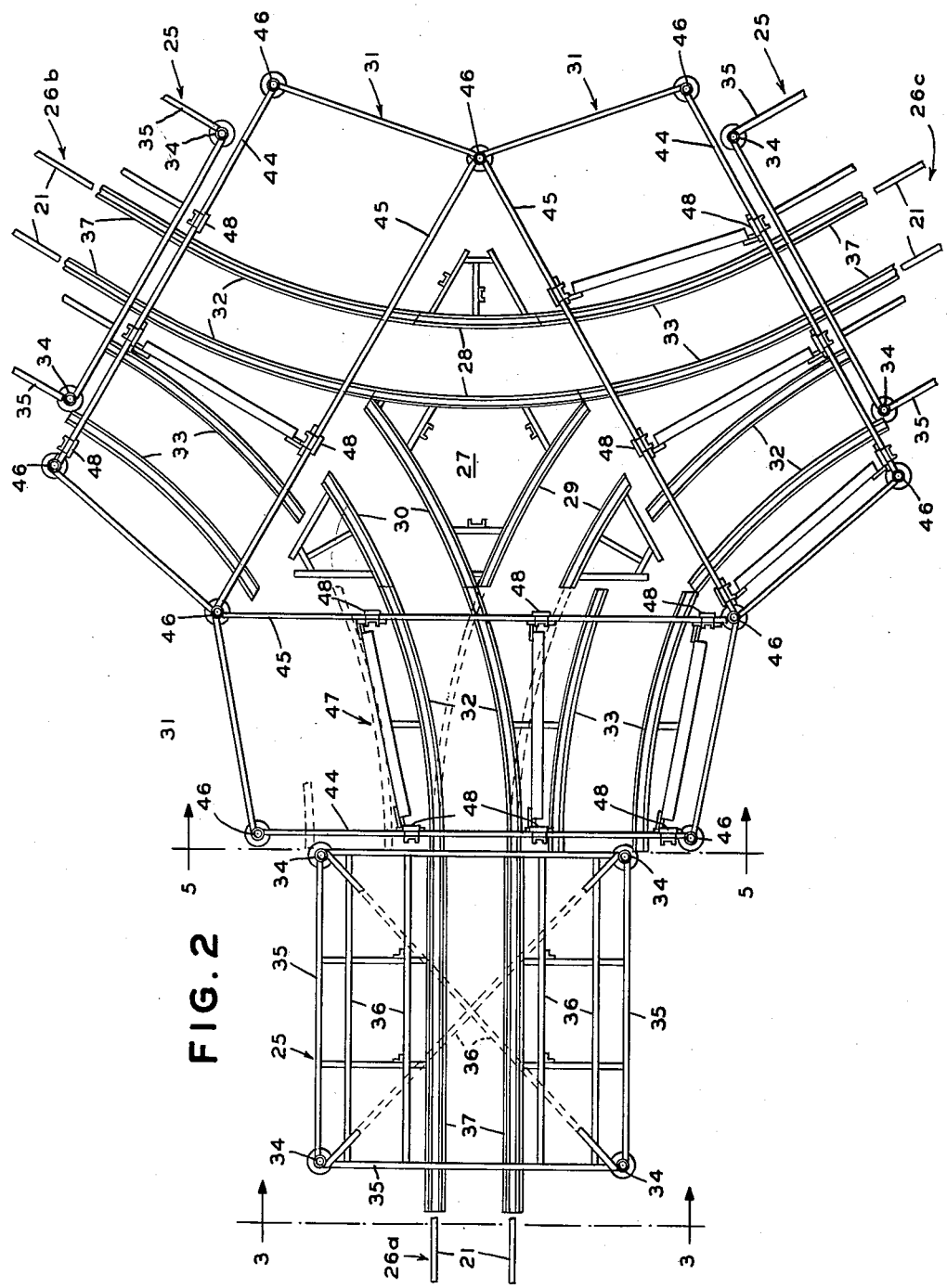
FIGURE 2 is a plan view of one of the switching points.

Each of the substations includes switching means whereby the direction of an aerial transporter may be changed as desired. Preferably, rigid rail sections are provided at the substations as well as means for effecting transfer of the transporter from the ropeway to the rigid rails and back to the ropeway. Transfer and switching means are shown in detail in FIGURES 2-5 and include transfer sections 25 by means of which the running members of an aerial transporter are transferred between the wire ropes and the rigid rails. While only one is shown in FIGURE 2, three transfer sections 25 may be provided which serve to terminate each of three ropeways 26a, 26b and 26c formed by wire ropes 21 and spaced radially at 120 degree intervals. A fixed section 27 of rigid rail is provided at the point of convergence of the three ropeways and includes three symmetrically disposed curved sections of parallel rigid rails 28, 29 and 30. Between each of the transfer sections 25 and the corresponding side of fixed section 27 there is provided a laterally movable section 31 carrying two sections of curved parallel track 32, 33.

Figure 3:
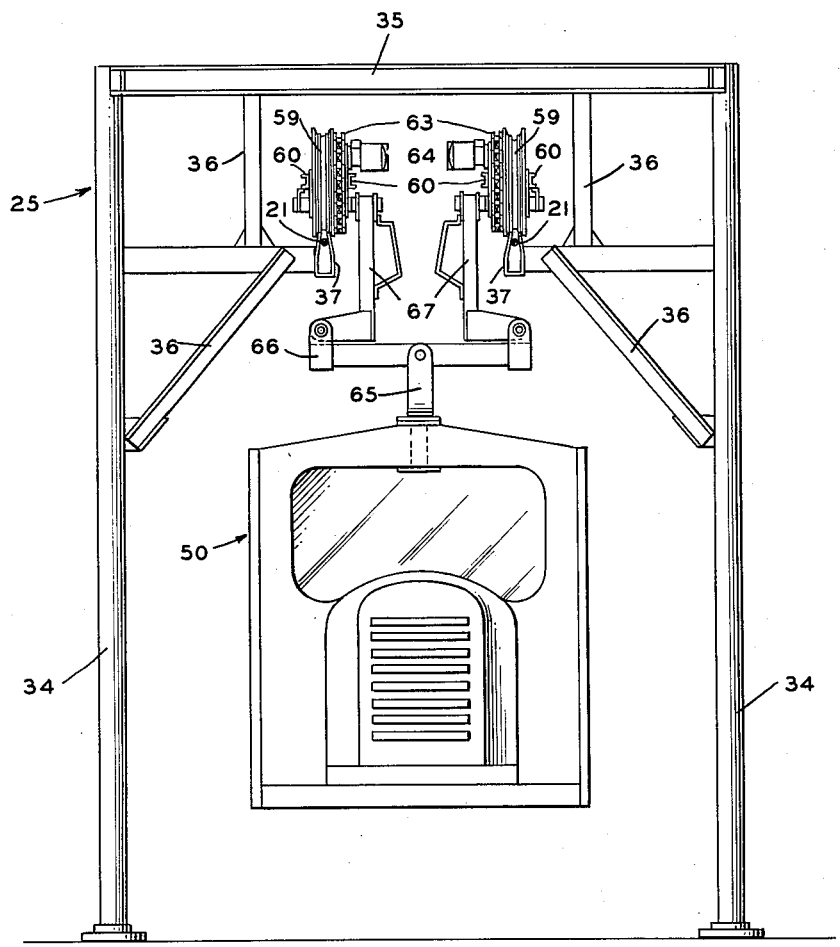
FIGURE 3 is an elevational view from the point of view of line 3—3 of FIGURE 2 and showing a transporter.
Figure 4:
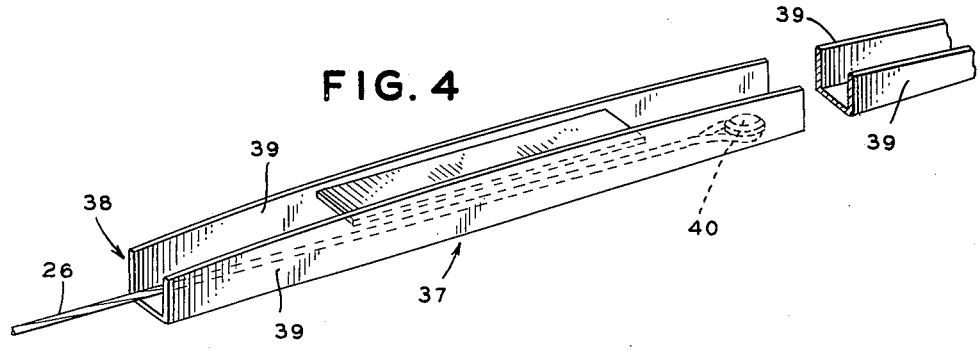
FIGURE 4 is an enlarged view of a detail of the transfer section shown in FIGURE 3.

Each of the transfer sections 25, FIGURE 3, comprises spaced uprights 34, cross members 35 and suitable braces 36 which serve to support guide members 37 in parallel spaced relation at a desired level. Guide members 37 each have at least one bearing surface adapted to receive the driven running members of the transporter and along which they are adapted to travel. As shown most clearly in FIGURE 4, guide members 37 may each at least in part be in the form of a U-shaped rail relatively narrow in transverse cross-section with an end opening 38, defined by side members 39, opening toward the direction in which ropeway 26 approaches the same. The width of side members 39 is tapered from end opening 38 so that the upwardly presented surfaces of members 39 rise relative to the associated rope 21 from a point below the rope to a point above the rope. Thus, a running member approaching guide member 37 is gradually raised up from engagement with the wire rope 21 and proceeds along the running surfaces of guide member 37. When proceeding in the opposite direction, the running member travels downwardly along the gradual incline formed by the tapered portions of side members 39 and then on engagement with wire rope 26 is gradually lifted off the running surface of the guide member and may then proceed along the wire rope. The wire ropes are conveniently anchored to guide members 37, as at 40, or other suitable portions of transfer sections 25 at a point somewhat removed from where the running members leave or enter upon them.

Figure 5:
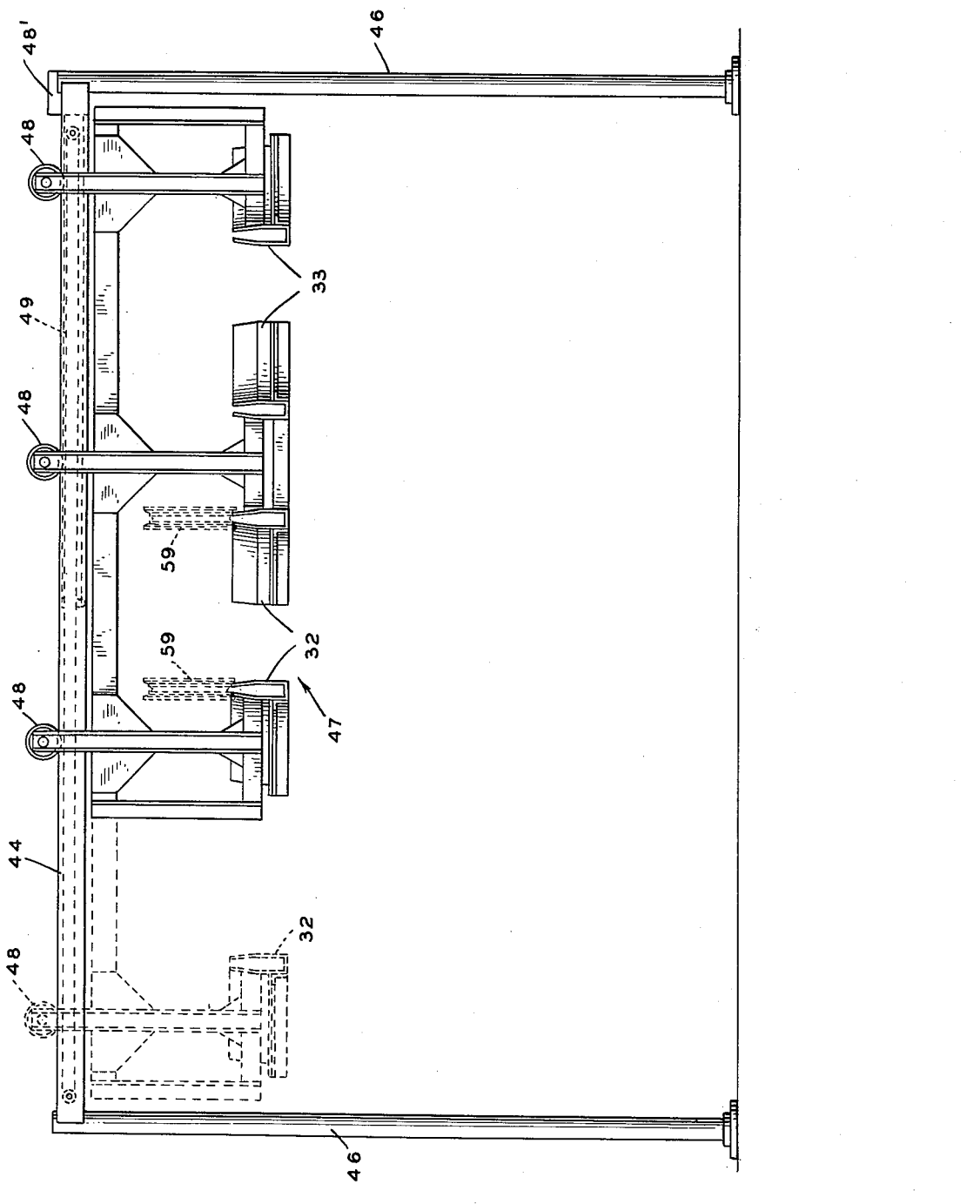
FIGURE 5 is an elevational view taken from the point of view of line 5—5 of FIGURE 2.

Each of the laterally movable sections 31, FIGURES 2 and 5, may comprise horizontal guide rails 44, 45 supported on suitable uprights 46. A laterally movable carriage 47 is supported from guide rails 44 by means of rollers 48. Carriage 47 when viewed as in FIGURE 5 presents two openings in one of which there is located curved track 32 and in the other of which there is located curved track 33. Carriage 47 is displaceable along guide rails 44, 45 between two positions. In one position of the carriage, track 32, as shown in FIGURE 2, serves to link guide tracks 37 with track 30 of fixed rail section 27. In its other position, with its left end in the position shown in phantom in FIGURE 5, carriage 47 by means of curved track 33 serves to link track 37 with track 29 of fixed track section 27. Any convenient arrangement such as motor 48' and rope 49 may be utilized to position carriage 47 as desired during operation.

Figure 1:
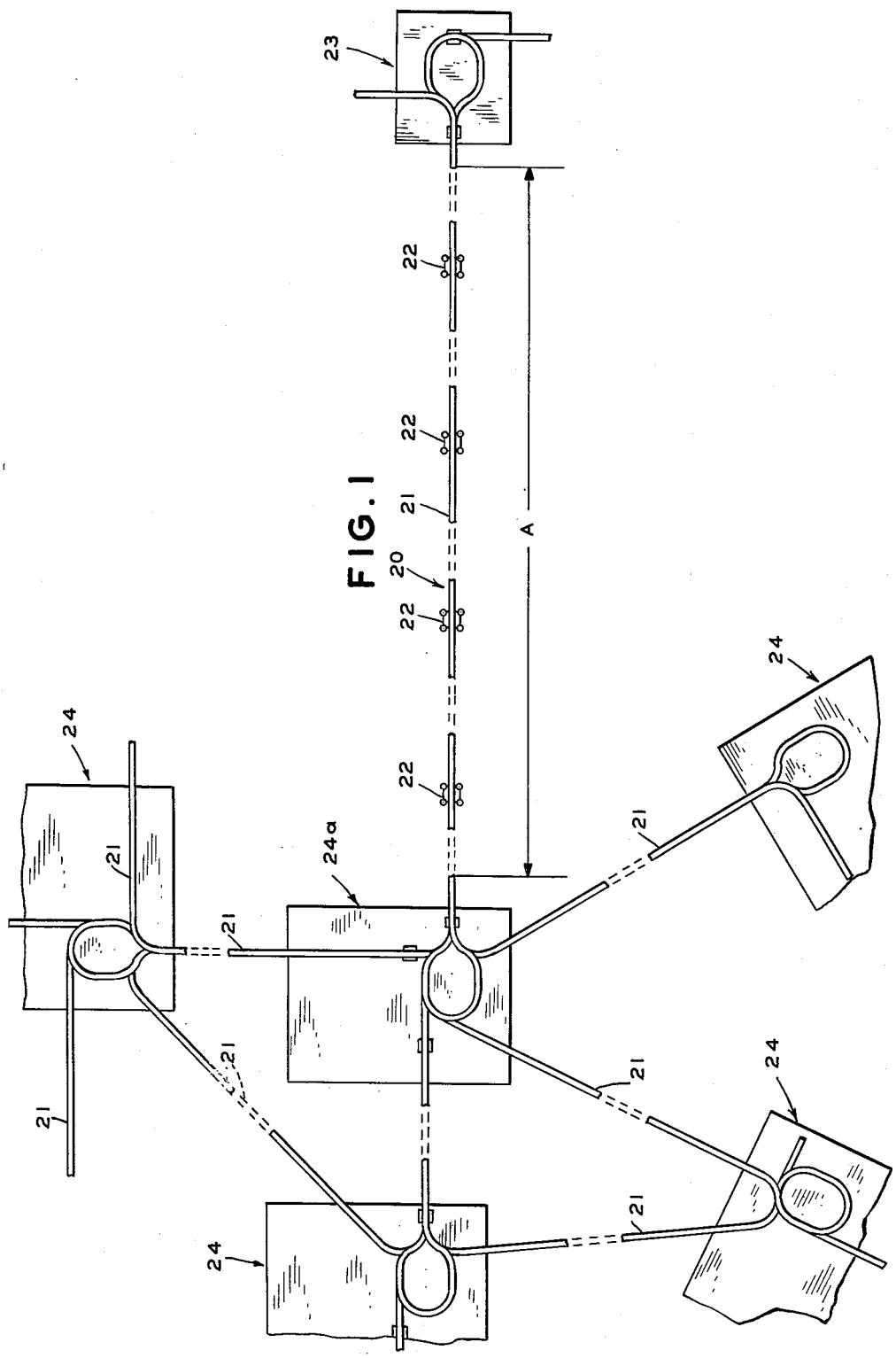

It will be evident that as shown in FIGURE 2, the switching means is arranged to provide a clear path between ropeways 26b and 26c through the sequence of tracks forming an extension of track section 28. By properly positioning the switching means any one of the three ropeways may be linked with either of the other two. As shown in Figure 1, one or more substations may be provided with extended rigid trackage so that a 360 degree turnaround is formed.

A transporter 50 is shown in FIGURE 3 in position on one of the transfer sections 25. The same transporter 50 is shown in side view on a straight section of ropeway 21 in FIGURE 6 and in top plan view on a curved section of rigid track in FIGURE 7. Transporter 50 comprises a main body or cargo carrying portion 51 suspended from the aerial way by means of four driven truck assemblies. Motive power is derived from a power unit 53, transmission 54, power divided 55 and hydraulic pumps 56, indicated schematically in FIGURE 6, and all housed in main body portion 51. The power divider 55 is a standard, commercial unit having one input shaft and two or more output shafts each of which delivers part of the input. An operator's space 57 may be provided, as indicated, while the remainder of main body portion 51 may be adapted for carrying passengers or freight. Main body portion 51 is provided with a structurally strong roof or main roof beam 51a which is articulated with the suspension system.

Each of the four truck assemblies 58 are similar in construction and each includes a pair of running members or wheels 59 joined in tandem relation by beams 60 to a frame member 61. Axles 59a of wheels 59 are each journaled into beams 60 thereby permitting relative vertical displacement between the wheels of each truck. The construction of wheels 59 will be pointed out in detail hereinafter, however, it is to be noted that each wheel carries a circular sprocket wheel 62 driven by means of a chain 63 which engages a sprocket on the shaft of a hydraulic motor 64. Hydraulic motors 64 are joined to pump 56 by suitable conduits which have been omitted from the drawings to avoid confusion.

It is to be observed that in the four truck arrangements now being described, the truck assemblies are juxtaposed to form front and rear pairs with the connection between a given pair of trucks on the one hand and the main body portion including a common clevis or connector 65. Furthermore, the connection between each truck of a pair and the common clevis is fully articulated so as to permit a high degree of mutually independent vertical displacement between the trucks of a given pair as well as the others.

Connector or clevis 65 is connected to roof beam 51a in such manner that the main body portion 51 is free to rotate in a horizontal plane relative to clevis 65. Members 66 and 67 serve to connect clevis 65 with frame members 61 of the associated trucks both to provided vertical articulation as pointed out and also to permit the main body portion 51 to swing sidewards to a limited extent.

Figure 6:
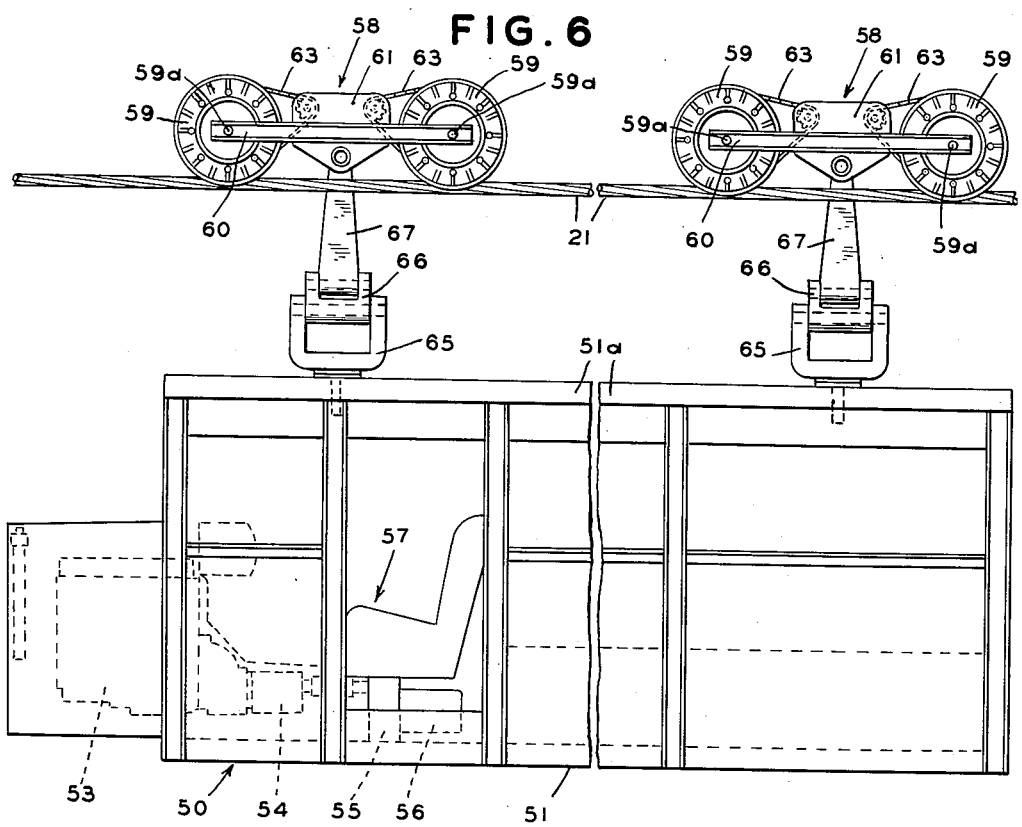
FIGURE 6 is a side elevational view of a self-propelled aerial transporter.
Figure 7:
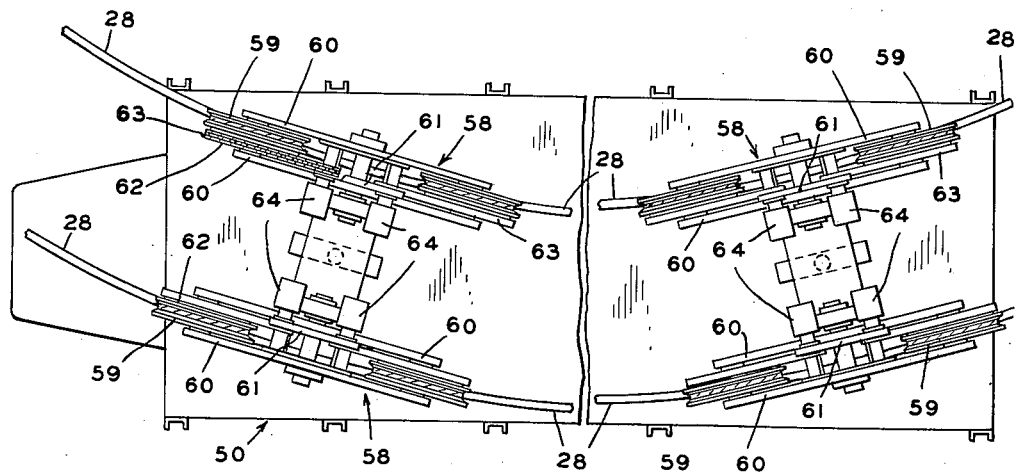
FIGURE 7 is a top plan view of the transporter shown in FIGURE 6.

As is apparent from FIGURES 6 and 7, both the front and rear pairs of trucks may be similarly secured to the main body portion 51. The reference characters which have been utilized to designate the parts forming the connection between the forward trucks and body portion 11 have been applied to the corresponding parts between the rear trucks and the body portion.

The catenary curvature of the ropes utilized in aerial systems apart from gradients introduced due to changes in altitude of the terrain traversed requires a high degree of traction between the transporter running members particularly when it is desired to utilize the transporter to carry substantial loads. To this end, running members or wheels 59 are provided with means which take advantage of the characteristic conformation of standed wire rope. Wire rope 21 forming ropeways 26 is of a well known configuration formed by uniformly twisting a plurality of strands 70 about a common center 71. The strands 70 may themselves be formed of a plurality of wires also twisted about a common center as is well known. A rope having a predetermined lay and number of strands has, along any given plane through the axis of the rope, a repetitive pattern as most clearly shown in FIGURES 9, 10 and 14. Advantage is taken of this repetitive pattern to provide greatly enhanced traction by utilizing driven running members 59 provided with an endless array of metallic traction members having teeth which conform to segments of the rope engaged thereby and have a center to center spacing equal to the length of the repeat of the wire rope pattern.

As most clearly shown in FIGURES 8–11 and 14, wheels 59 comprise an annular disc 76 to the rim portion of which a pair of annular members or rims 74 are connected by means of bolts 75. Rims 74 serve to secure to the peripheral surface 77 of disc 76, an annular traction ring member or liner 72 having an inner diameter conforming to the outer diameter of disc 76. Shoulder portions 73 of liner 72 are substantially greater in width than the radially outer portion of liner 72 and seat in a complementary channel formed between rims 74. The outwardly presented peripheral surface of liner 72 is formed to provide an endless array of tooth-like traction elements in groups spaced to conform to the pattern formed by wire rope 21. Two outer teeth 78, 79 are generally diametrical opposites and have concave surfaces 80, 81 respectively. Each pair of opposed teeth 78, 79 form a channel therebetween to receive wire rope 21 and along the base of which there is provided a third tooth-like traction member 82 adapted to seat in the portion of the helical groove formed between adjacent strands 70 where said groove passes over the top of the wire rope as most clearly shown in FIGURE 9. Teeth 78, 79, in addition to helicoidal surfaces 80, 81 which conform to the curvature of sectors of the strands which they engage are provided as well with inwardly presented edges 80a, 81a respectively each of which is also adapted to seat in the helical groove formed between the strand upon which its tooth bears and the one immediately above. The three traction elements in each group not only engage the rope to provide a remarkable degree of traction as will be more fully pointed out but also prevent the rope from turning due to the fact that teeth 78 and 79 engage upwardly presented surfaces on opposite sides of the rope.

Rims 74 serve to engage the rigid rail sections and to that end are provided with bearing surfaces 83. A series of tapped holes is provided in one of the rims 74 to receive bolts 84 which serve to secure a sprocket 62 thereto for engagement with a drive chain 63 as shown in FIGURES 6 and 7.

Another embodiment of the running member which provides unique advantages is shown in FIGURES 12 and 13. In this instance, to wheel disc 85 there is connected by means of bolts 86 an annular traction member 87 having an endless array of tooth-like traction elements 88, 89 and 90 corresponding respectively to elements 78, 79 and 82 previously described in connection with FIGURE 9. Annular traction member 87 is a unitary, integral structure and includes annular running surfaces 91 integral with the teeth and which engage and run on rigid rail sections of somewhat different configuration than those described hereinabove. A sprocket 62 is also mounted on this running member by means of bolts 84 which engage in tapped holes provided for that purpose about an exterior side surface of traction member 87.

It is most clearly evident from FIGURE 14 that instead of relying on traction developed between a wheel and the surface of the wire rope which has the same inclination as the rope's longitudinal axis, advantage is taken of the fact that segments of the surface of the rope to which the tooth-like traction elements conform are inclined to the axis and do not form as great an angle with a horizontal plane. The manner in which the teeth mesh with the wire rope provides greater traction between the metallic traction members and the rope than hitherto obtained with materials such as rubber normally having a more favorable coefficient of friction. Traction members 72 and 87 are preferably formed from bronze as by casting or the like in order to provide members having favorable wearing properties while minimizing wearing of the wire ropes.

A still further embodiment of a running member is illustrated in FIGURES 15, 16 and 17. A plurality of metal lugs 95 are mounted in spaced annular array about the periphery of wheel disc 96 where they are retained by means of rims 97, somewhat similar to rims 74, and connected to the wheel disc by means of bolts 98. Lugs 95 are tapered so as to be locked in a complementary channel formed between the opposed rims 97. Between the base of lugs 95 and the peripheral surface of wheel disc 96 a band 99 of rubber or rubber-like material is provided. As shown in FIGURE 15, blanks or spacers 100 are provided between adjacent lugs 95.

As shown in FIGURES 16 and 17 each of the lugs 95 is generally U-shaped in cross-section providing a channel 101 to receive and grip a section of wire rope 21. Referring to FIGURE 10, the lines designated "A" indicate regularly reoccurring planes through the wire rope 21 normal to its axis at which the rope's top-to-bottom width is maximum but minimum from side-to-side. The planes indicated by lines "B" occur at the points where the rope's side-to-side width is maximum. The inner side walls 102 of each of the lugs 95 are tapered so as to provide a constriction in channel 101 between the center lines 103 of side walls 102, each of the side walls forming an angle greater than 180 degrees to conform to the shape of the rope. Lugs 95 and spacers 100 are so dimensioned and arranged that the lugs engage the wire rope with their constrictions, formed between the portions 103 of their side walls 102, coincident with portions of the rope designated by alternate lines "A."

While lugs 95 provide an improvement in traction it is not as great as that provided by traction members such as members 72. Tests have shown that under varying load conditions trucks equipped with wheels having traction members 72 can navigate a wire rope presenting a grade of from about 40.9% to about 45.5% without slippage. With some slippage grades up to about 50.0% can be navigated. Wheels equipped with lugs 95 under similar test conditions navigated grades from about 25.4% to about 26.8% under varying load but without slippage. Grades of about 28.2% were navigated with some slippage These results show a marked improvement in grade climbing capabilities even when compared to the best results attainable with rubber or rubber-like traction devices, such as neoprene. In the case of traction members 72 the equavalent rolling friction coefficient was found to be 4.4% which is remarkably greater than that usually present in metal-to-metal contact and represent an improvement of about 70% over results hitherto considered to be good obtained with a wheel having a neoprene traction liner.

Traction members 72 have been described and shown as unitary ring-like members. However, it is to be noted that each group of three teeth may, if desired, be formed as an individual element, such elements being mounted in annular array with spaces therebetween as was described in connection with lugs 95. Similarly, lugs 95 and spacers 100 may be formed as an intergral ring-like member.

While traction members 72, 87 and 95 are preferably formed of metal as hereinbefore described, it is contemplated that other suitable materials including plastics or the like may be utilized. In fact, one of the advantages of the present invention resides in that greater latitude is permitted in the choice of materials in forming the traction members due to the improved traction provided, thereby making possible the use of materials which hitherto would have been entirely unsuitable.

It is apparent that a novel and highly advantageous aerial transportation system with self-propelled transporters capable of a high degree of mobility over aerial ways formed of both wire rope and rigid rail having greatly improved grade climbing capabilities has been provided in accordance with the present invention. The terms and expression which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. A self-propelled aerial transporter for traversing an aerial way suspended in space and formed at least in part by spaced parallel stranded wire ropes having a predetermined lay, comprising a plurality of running members, traction means on said running members for directly engaging said wire ropes and including a plurality of groups of teeth, each of said groups comprising two substantially diametrically opposite teeth defining a channel for receiving one of said wire ropes, said teeth each having surfaces complementary to and for engaging sectors of the surface of said ropes forming a portion of the surface pattern thereof repeated along said rope at intervals determined by said lay, said groups being spaced about said running members at intervals corresponding to said first mentioned intervals, and propulsion means connected directly to said running members for driving the same.

2. A self-propelled aerial transporter for traversing an aerial way suspended in space and formed at least in part by spaced parallel stranded wire ropes having a predetermined lay, comprising a plurality of running members, traction means on said running members for directly engaging said wire ropes and including a plurality of groups of teeth, each of said groups comprising two substantially diametrically opposite teeth defining a channel for receiving one of said wire ropes, said teeth each having surfaces complementary to and for engaging sectors of the surface of said ropes forming a portion of the surface pattern thereof repeated along said rope at intervals determined by said lay, said groups being spaced about said running members at intervals corresponding to said first mentioned intervals, each of said groups of teeth including a third tooth intermediate said diametrically opposite teeth and defining a helicoidal surface adapted to seat in the helicoidal groove formed between adjacent strands of said wire rope, and propulsion means connected directly to said running members for driving the same.

3. A self-propelled aerial transporter for traversing an aerial way suspended in space and formed at least in part by spaced parallel stranded wire ropes having a predetermined lay, comprising a plurality of running members, traction means on said running members for directly engaging said wire ropes and including a plurality of groups of teeth, each of said groups comprising two substantially diametrically opposite teeth defining a channel for receiving one of said wire ropes, said teeth each having surfaces complementary to and for engaging sectors of the surface of said ropes forming a portion of the surface pattern thereof repeated along said rope at intervals determined by said lay, said groups being spaced about said running members at intervals corresponding to said first mentioned intervals, each of said groups of teeth including a third tooth intermediate said diametrically opposite teeth and defining a helicoidal surface adapted to seat in the helicoidal groove formed along the top of one of said wire ropes and transverse to the longitudinal axis of said rope, and propulsion means connected directly to said running members for driving the same.

4. A self-propelled aerial transporter for traversing an aerial way suspended in space and formed at least in part by spaced parallel stranded wire ropes having a predetermined lay, comprising a plurality of running members, traction means on said running members for directly engaging said wire ropes and including a plurality of groups of teeth, each of said groups comprising two substantially diametrically opposite teeth defining a channel for receiving one of said wire ropes, said teeth each having surfaces complementary to and for engaging sectors of the surface of said ropes forming a portion of the surface pattern thereof repeated along said rope at intervals determined by said lay, said groups being spaced about said running members at intervals corresponding to said first mentioned intervals, each of said groups of teeth including a third tooth intermediate said diametrically opposite teeth, each of the teeth in said groups defining a helicoidal surface adapted to seat in a helicoidal groove formed between adjacent strands of said wire rope, said third tooth being disposed to seat in the helicoidal groove along the top of said wire rope, and propulsion means connected directly to said running members for driving the same.

5. A self-propelled aerial transporter for traversing an aerial way suspended in space and formed at least in part by spaced parallel stranded wire ropes having a predetermined lay, comprising a plurality of running members, traction means on said running members for directly engaging said wire ropes and including a plurality of groups of teeth, each of said groups comprising two substantially diametrically opposite teeth defining a channel for receiving one of said wire ropes, said teeth each having surfaces complementary to and for engaging sectors of the surface of said ropes forming a portion of the surface pattern thereof repeated along said rope at intervals determined by said lay, said groups being spaced about said running members at intervals corresponding to said first mentioned intervals, each of said groups of teeth including a third tooth intermediate said diametrically opposite teeth, each of the teeth in said groups defining a helicoidal surface adapted to seat in a helicoidal groove formed between adjacent strands of said wire rope, said third tooth being disposed to seat in the helicoidal groove along the top of said wire rope, each of said diametrically opposite teeth having a concave surface the curvature of which conforms to the sectors of the helically curved surface of the strands of the wire rope engaged thereby, and propulsion means connected directly to said running members for driving the same.

6. A self-propelled aerial transporter for traversing an aerial way suspended in space and formed at least in part by spaced parallel stranded wire ropes having a predetermined lay, comprising a plurality of running members, traction means on said running members for directly engaging said wire ropes and including a plurality of groups of teeth, each of said groups comprising two substantially diametrically opposite teeth defining a channel for receiving one of said wire ropes, said teeth each having surfaces complementary to and for engaging sectors of the surface of said ropes forming a portion of the surface pattern thereof repeated along said rope at intervals determined by said lay, said groups being spaced about said running members at intervals corresponding to said first mentioned intervals, each of said teeth having surfaces forming part of said channel and defining an angle greater than 180 degrees, the teeth of each group having divergent oppositely presented walls formed by said last mentioned surfaces which form a constriction in said channel, and propulsion means connected directly to said running members for driving the same.

7. A traction member for engaging a stranded wire rope having a predetermined lay, comprising two substantially diametrically opposite teeth defining a channel for receiving said wire rope, said teeth each having surfaces complementary to and for engaging sectors of the surface of said rope on opposite sides thereof forming a portion of the surface pattern thereof repeated along said rope at intervals determined by said lay.

8. A traction member for engaging a stranded wire rope having a predetermined lay, comprising two substantially diametrically opposite teeth defining a channel for receiving said wire rope, said teeth each having surfaces complementary to and for engaging sectors of the surface of said rope on opposite sides thereof forming a portion of the surface pattern thereof repeated along said rope at intervals determined by said lay, and a third tooth intermediate said diametrically opposite teeth and defining a helicoidal surface adapted to seat in a helicoidal groove formed between adjacent strands of said wire rope.

9. A traction member for engaging a stranded wire rope having a predetermined lay, comprising two substantially diametrically opposite teeth defining a channel for receiving said wire rope, said teeth each having surfaces complementary to and for engaging sectors of the surface of said rope on opposite sides thereof forming a portion of the surface pattern thereof repeated along said rope at intervals determined by said lay, a third tooth intermediate said diametrically opposite teeth, and each of said teeth defining a helicoidal surface adapted to seat in a helicoidal groove formed between adjacent strands of said wire rope, said third tooth being disposed to seat in the helicoidal groove along the top of said wire rope.

10. A traction member for engaging a stranded wire rope having a predetermined lay, comprising two substantially diametrically opposite teeth defining a channel for receiving said wire rope, said teeth each having surfaces complementary to and for engaging sectors of the surface of said rope on opposite sides thereof forming a portion of the surface pattern thereof repeated along said rope at intervals determined by said lay, each of said teeth having surfaces forming part of said channel and defining an angle greater than 180 degrees, and said teeth having divergent oppositely presented walls formed by said last mentioned surfaces which form a constriction in said channel.

11. Traction means for engaging a stranded wire rope having a predetermined lay, comprising a plurality of groups of teeth, each of said groups including two substantially diametrically opposite teeth defining a channel for receiving said wire rope, said teeth each having surfaces complementary to and for engaging sectors of the surface of said rope on opposite sides thereof forming a portion of the surface pattern thereof repeated along said rope at intervals determined by said lay, a third tooth intermediate said diametrically opposite teeth, and each of said teeth defining a helicoidal surface adapted to seat in a helicoidal groove formed between adjacent strands of said wire rope, said third tooth being disposed to seat in the helicoidal groove along the top of said wire rope, and means supporting said groups in spaced endless array with the intervals between said groups corresponding to said first mentioned intervals.

12. Traction means for engaging a stranded wire rope having a predetermined lay, comprising a plurality of groups of teeth, each of said groups including two substantially diametrically opposite teeth defining a channel for receiving said wire rope, said teeth each having surfaces complementary to and for engaging sectors of the surface of said rope on opposite sides thereof forming a portion of the surface pattern thereof repeated along said rope at intervals determined by said lay, a third tooth intermediate said diametrically opposite teeth, each of said teeth defining a helicoidal surface adapted to seat in a helicoidal groove formed between adjacent strands of said wire rope, said third tooth being disposed to seat in the helicoidal groove along the top of said wire rope, means supporting said groups in spaced endless array with the intervals between said groups corresponding to said first mentioned intervals, and means defining a surface for engaging and running along a rigid rail.

13. Traction means for engaging a stranded wire rope having a predetermined lay, comprising a plurality of groups of teeth, each of said groups including two substantially diametrically opposite teeth defining a channel for receiving said wire rope, said teeth each having surfaces complementary to and for engaging sectors of the surface of said rope on opposite sides thereof forming a portion of the surface pattern thereof repeated along said rope at intervals determined by said lay, a third tooth intermediate said diametrically opposite teeth, each of said teeth defining a helicoidal surface adapted to seat in a helicoidal groove formed between adjacent strands of said wire rope, said third tooth being disposed to seat in the helicoidal groove along the top of said wire rope, and means supporting said groups in spaced circular array with the intervals between said groups corresponding to said first mentioned intervals.

14. Traction means for engaging a stranded wire rope having a predetermined lay, comprising a plurality of groups of teeth, each of said groups including two substantially diametrically opposite teeth defining a channel for receiving said wire rope, said teeth each having surfaces complementary to and for engaging sectors of the surface of said rope on opposite sides thereof forming a portion of the surface pattern thereof repeated along said rope at intervals determined by said lay, each of said teeth having surfaces forming part of said channel and defining an angle greater than 180 degrees, and said teeth having divergent oppositely presented walls formed by said last mentioned surfaces which form a constriction in said channel.

15. A running member for engaging a stranded wire rope having a predetermined lay, comprising an annular disc, means secured to said disc adjacent to the periphery thereof and forming two oppositely disposed rim members defining an annular channel therebetween, and a plurality of groups of teeth secured in spaced endless array in said channel, each of said groups including two substantially diametrically opposite teeth defining a channel for receiving said wire rope, said teeth each having surfaces complementary to and for engaging sectors of the surface of said rope on opposite sides thereof forming a portion of the surface pattern thereof repeated along said rope at intervals determined by said lay.

16. A running member for engaging a stranded wire rope having a predetermined lay, comprising an annular disc, means secured to said disc adjacent to the periphery thereof and forming two oppositely disposed rim members, defining an annular channel therebetween, a plurality of groups of teeth secured in spaced endless array in said channel, each of said groups including two substantially diametrically opposite teeth defining a channel for receiving said wire rope, said teeth each having surfaces complementary to and for engaging sectors of the surface of said rope on opposite sides thereof forming a portion of the surface pattern thereof repeated along said rope at intervals determined by said lay, and said means defining a pair of surfaces one on each side of said array of groups of teeth and for engaging and running along a rigid rail.

17. A running member for engaging a stranded wire rope having a predetermined lay, comprising an annular disc, means secured to said disc adjacent to the periphery thereof and forming two oppositely disposed rim members defining an annular channel therebetween, a plurality of groups of teeth secured in spaced endless array in said channel, each of said groups including two substantially diametrically opposite teeth defining a channel for receiving said wire rope, said teeth each having surfaces complementary to and for engaging sectors of the surface of said rope on opposite sides thereof forming a portion of the surface pattern thereof repeated along said rope at intervals determined by said lay, a third tooth intermediate said diametrically opposite teeth, and each of said teeth defining a helicoidal surface adapted to seat in a helicoidal groove formed between adjacent strands of said wire rope, said third tooth being disposed to seat in the helicoidal groove along the top of said wire rope.

18. A running member for engaging a stranded wire rope having a predetermined lay, comprising an annular disc, means secured to said disc adjacent to the periphery thereof and forming two oppositely disposed rim members, defining an annular channel therebetween, a plurality of groups of teeth secured in spaced endless array in said channel, each of said groups including two substantially diametrically opposite teeth defining a channel for receiving said wire rope, said teeth each having surfaces complementary to and for engaging sectors of the surface of said rope on opposite sides thereof forming a portion of the surface pattern thereof repeated along said rope at intervals determined by said lay, a third tooth intermediate said diametrically opposite teeth, each of said teeth defining a helicoidal surface adapted to seat in a helicoidal groove formed between adjacent strands of said wire rope, said third tooth being disposed to seat in the helicoidal groove along the top of said wire rope, and said means defining a pair of surfaces one on each side of said array of groups of teeth and for engaging and running along a rigid rail.

19. A running member for engaging a stranded wire rope having a predetermined lay, comprising an annular disc, means secured to said disc adjacent to the periphery thereof and forming two oppositely disposed rim members defining an annular channel therebetween, a plurality of groups of teeth secured in spaced endless array in said channel, each of said groups including two substantially diametrically opposite teeth defining a channel for receiving said wire rope, said teeth each having surfaces complementary to and for engaging sectors of the surface of said rope on opposite sides thereof forming a portion of the surface pattern thereof repeated along said rope at intervals determined by said lay, each of said teeth having surfaces forming part of said channel and defining an angle greater than 180 degrees, and said teeth having divergent oppositely presented walls formed by said last mentioned surfaces which form a constriction in said channel.

20. A running member for engaging a stranded wire rope having a predetermined lay, comprising an annular disc, means secured to said disc adjacent to the periphery thereof and forming two oppositely disposed rim members defining an annular channel therebetween, a plurality of groups of teeth secured in spaced endless array in said channel, each of said groups including two substantially diametrically opposite teeth defining a channel for receiving said wire rope, said teeth each having surfaces complementary to and for engaging sectors of the surface of said rope on opposite sides thereof forming a portion of the surface pattern thereof repeated along said rope at intervals determined by said lay, each of said teeth having surfaces forming part of said channel and defining an angle greater than 180 degrees, said teeth having divergent oppositely presented walls formed by said last mentioned surfaces which form a constriction in said channel, and said means defining a pair of surfaces one on each side of said array of groups of teeth and for engaging and running along a rigid rail.

21. A self-propelled aerial transporter for traversing an aerial way suspended in space and formed at least in part by spaced parallel stranded wire ropes each having a substantially uniform lay providing a variation in the side-to-side width of the rope repeated substantially uniformly therealong and forming two sets of sectors along the rope with the sectors of one set where said width is greatest alternating with the sectors of the other set where said width is least, comprising a plurality of running members, traction means on said running members for directly engaging said wire ropes and including a plurality of spaced groups of teeth with the teeth of each group being spaced in opposed side-by-side relation transverse to the direction of advance of said running member so as to receive a portion of one of said wire ropes in the space between them and defining surfaces complementary to the sectors of a predetermined one of said sets, said groups being spaced about said running members at intervals corresponding to that at which the sectors of said predetermined set are repeated along said ropes and for engaging the ropes solely at the sectors of said predetermined set, and propulsion means connected directly to said running members for driving the same.

22. A self-propelled aerial transporter for traversing an aerial way suspended in space and formed at least in part by spaced parallel stranded wire ropes each having a substantially uniform lay providing a variation in the side-to-side width of the rope repeated substantially uniformly therealong and forming two sets of sectors along the rope with the sectors of one set where said width is greatest alternating with the sectors of the other set where said width is least, comprising a plurality of running members, metallic traction means on said running members for directly engaging said wire ropes and including a plurality of spaced groups of metallic teeth with the teeth of each group being spaced in opposed side-by-side relation transverse to the direction of advance of said running member so as to receive a portion of one of said wire ropes in the space between them and defining surfaces complementary to the sectors of a predetermined one of said sets, said groups being spaced about said running members at intervals corresponding to that at which the sectors of said predetermined set are repeated along said ropes and for engaging the ropes solely at the sectors of said predetermined set, and propulsion means connected directly to said running members for driving the same.

23. A self-propelled aerial transporter for traversing an aerial way suspended in space and formed at least in part by spaced parallel stranded wire ropes each having a substantially uniform lay providing a variation in the side-to-side width of the rope repeated substantially uniformly therealong and forming two sets of sectors along the rope with the sectors of one set where said width is greatest alternating with the sectors of the other set where said width is least, comprising a plurality of running members, metallic traction means on said running members for directly engaging said wire ropes and including a plurality of spaced groups of metallic teeth with the teeth of each group defining a channel therebetween for sequentially receiving the sectors of a predetermined one of said sets, said teeth defining surfaces complementary to the sectors of said predetermined set, said groups being spaced about said running members at intervals corresponding to that at which the sectors of said predetermined set are repeated along said ropes and for engaging the rope solely at the sectors of said predetermined set, and propulsion means connected directly to said running members for driving the same.

References Cited in the file of this patent

UNITED STATES PATENTS

| | | |
|---|---|---|
| 600,925 | Miller | Mar. 22, 1898 |
| 601,353 | Miller | Mar. 29, 1898 |
| 601,756 | Miller | Apr. 5, 1898 |
| 889,642 | Sweeney | June 2, 1908 |
| 1,259,620 | Hallack | Mar. 19, 1918 |
| 1,696,946 | Felts | Jan. 1, 1929 |
| 2,019,760 | Mattro | Nov. 5, 1935 |
| 2,198,536 | Johansen et al. | Apr. 23, 1940 |
| 2,211,220 | Verplanck | Aug. 13, 1940 |
| 2,632,153 | Swanger | Mar. 17, 1953 |
| 2,633,054 | Black | Mar. 31, 1953 |
| 2,802,366 | Borner | Aug. 13, 1957 |

FOREIGN PATENTS

| | | |
|---|---|---|
| 121,179 | Austria | Feb. 10, 1931 |